INVENTOR
HSIA-S. PIEN
ATTORNEY

May 29, 1962  HSIA-SI PIEN  3,037,178
LOAD CELL
Filed Aug. 10, 1959  2 Sheets-Sheet 2
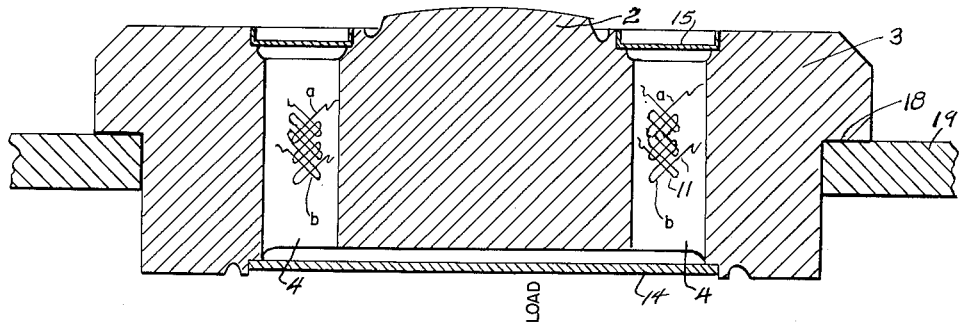
FIG. 3
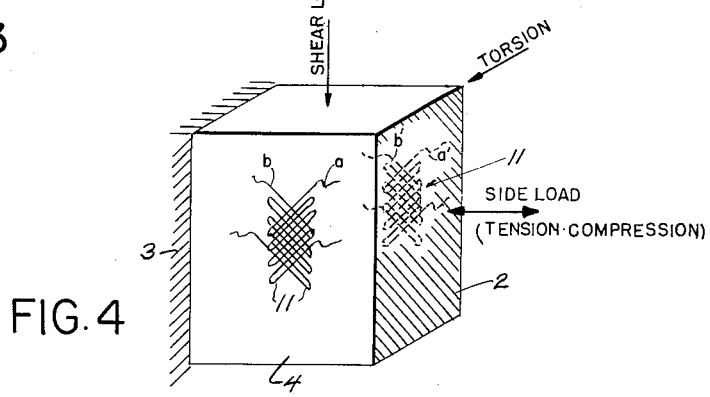
FIG. 4
FIG. 5 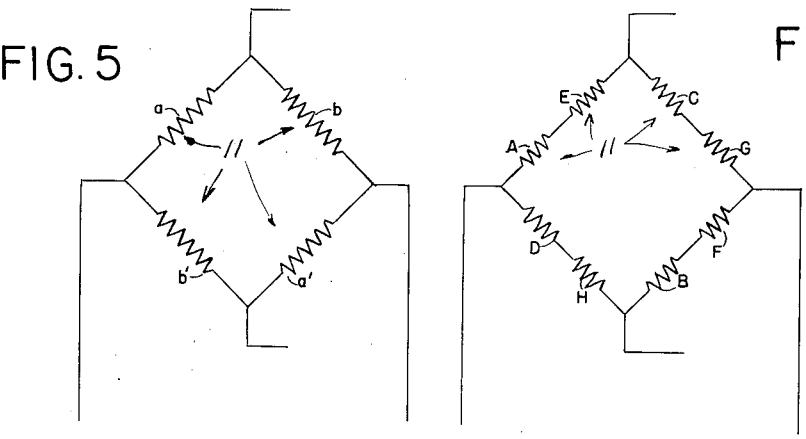 FIG. 6 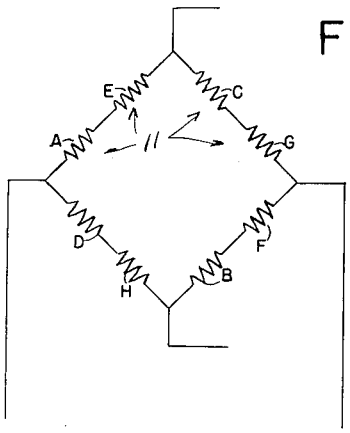
INVENTOR.
HSIA S. PIEN
BY
ATTORNEY

United States Patent Office 3,037,178
Patented May 29, 1962

3,037,178
LOAD CELL
Hsia-Si Pien, Newton, Mass., assignor to Baldwin-Lima-Hamilton Corporation, a corporation of Pennsylvania
Filed Aug. 10, 1959, Ser. No. 832,732
5 Claims. (Cl. 338—5)

This invention relates to electrical devices for measuring force and weight, more particularly known as "load cells."

The particular form of load cell disclosed herein is of the type in which the load to be measured induces strain in a member measured by electrical impedance strain responsive means which, as specifically shown herein, is preferably an electrical resistance bonded type strain gage. One of the very difficult problems in load cells has been to make a cell, for any given capacity, of extremely small height for applications where limited space is available for installation, and at the same time obtain a satisfactory degree of linearity of load versus electrical output, insensitivity to substantial eccentric loading, and minimum hysteresis, together with ruggedness, and economy of manufacture and maintenance. Many attempts have been made to produce small height load cells having such characteristics but such cells have not been as low in height as is frequently desired or, if so, they have been complicated in construction or deficient in other respects.

It is an object of my invention to provide an improved load cell of the electrical strain sensitive type that, for any given capacity, is extremely small in height and yet has the above mentioned structural and functional characteristics to a very satisfactory degree.

Another object is to provide an improved load cell of the electrical strain sensitive type that is relatively simple and economical in construction, operation and maintenance and that has a very small height combined with an extraordinary degree of ruggedness.

Further objects and advantages will be more apparent to those skilled in the art from the following description of the accompanying drawings in which:

FIG. 3 is a modified arrangement for supporting the cell;

FIG. 4 is a perspective of a shear sensing element removed from the cell to illustrate more clearly how torsion, and tension-compression side load effects, may be more completely eliminated when an extraordinary degree of shear accuracy is desired; and FIGS. 5 and 6 illustrate gage arrangements in bridges employed in my cell.

Figure 1:
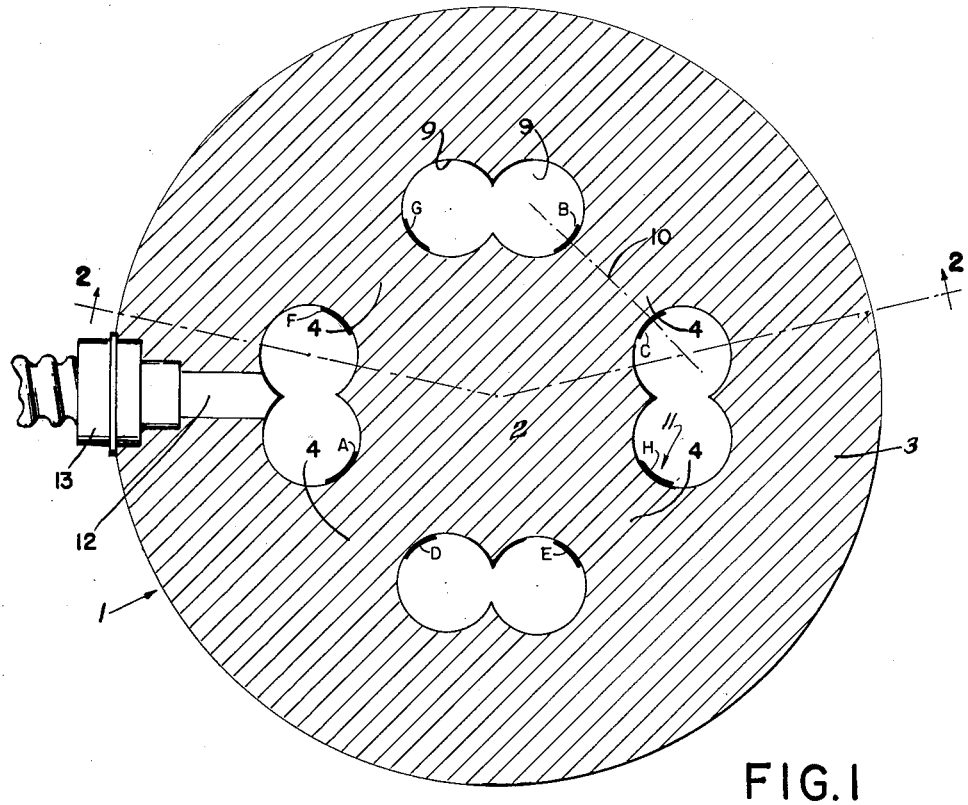
FIG. 1 is a horizontal section taken substantially on the line 1—1 of FIG. 2.
Figure 2:
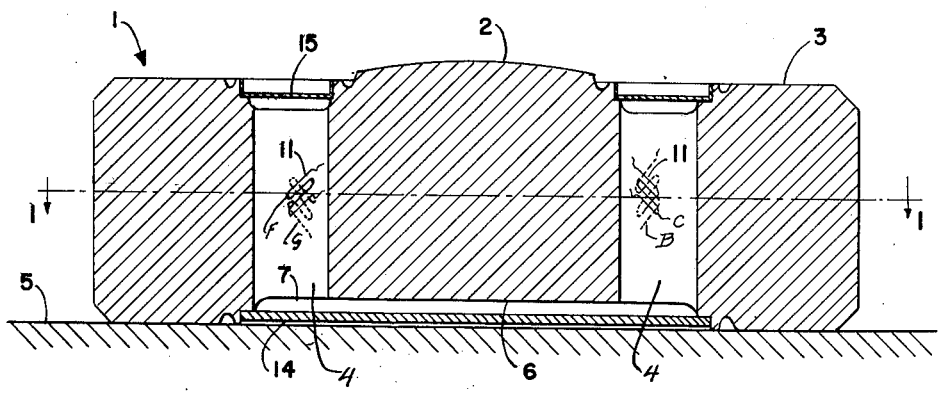
FIG. 2 is a vertical section taken substantially on the line 2—2 of FIG. 1.

In the particular embodiment of the invention disclosed herein I provide a preferably single solid member generally indicated at 1, FIG. 1, preferably circular in plan view and of any suitable strain responsive material such, for example, as steel. This solid member has an axially extending central load receiving portion 2 and a preferably concentric outer circular load supporting portion 3 somewhat in the nature of a ring. The inner and outer portions 2 ans 3 are connected by a plurality of radially extending shear sensing elements 4 specifically shown as four in number although any suitable number may be employed depending upon the load capacity desired. The ring portion 3 is seated upon any flat surface 5 for supporting a load while the lower or bottom circumferentially extending end 6 of the receiving portion 2 and the lower surface 7 of the shear sensing elements are machined so as to be spaced inwardly from the plane containing the lower surface of the ring 3 thereby insuring complete freedom of movement of the central portion 2 and of the shear sensing elements. The top circumferentially extending surface of the shear sensing elements is preferably similarly spaced inwardly of the top surface of the central portion 2. The portions 2 and 3 broadly encircle an axis that extends generally in the direction of applied load and the shear sensing elements are rigidly connected at their ends to said portions.

The shear sensing elements are created preferably by forming circumferentially spaced axially extending holes, or slots, preferably made in a relatively simple yet highly effective manner by simply drilling holes 9, preferably two in number, in partially overlapping relation at preferably symmetrical locations circumferentially of the cell. The resulting portion between the sets of holes constitutes the shear sensing elements 4 whose narrowest section may be determined by drawing lines such as 10 between the centers of the holes immediately adjacent to each side of any given shear sensing element. To measure the strain in these elements 4 I preferably employ well-known bonded grid type strain gages of the electrical resistance filament type 11 placed preferably symmetrically about an axially extending plane containing line 10. In other words, the axis of the cell is generally vertical, relatively speaking, as it may be also used in a horizontal position, and the gages extend in the direction of such axis with the gage filaments at 45° thereto so as to respond to shear strains induced in elements 4 when a load is applied to portion 2. These gages may be placed singly on each axially extending side surface of each beam although as shown in FIG. 3 (one element being enlarged in FIG. 4) two gages may be placed on each side of the shear sensing elements to more completely eliminate torsion and tension-compression side load effects, thereby providing self-compensation. To accomplish this the gages A–H of FIG. 1 are connected in a Wheatstone bridge as shown in FIG. 6 while the gages $a$, $a'$, $b$, $b'$ are connected as in FIG. 5. The gages for a plurality of shear sensing elements such as shown in FIG. 4 are arranged so that all compression gages are placed in two opposing arms and all tension gages in the adjacent opposing arms. Changes in electrical resistance of the gages in response to strain induced by load may be measured by usual electrical instrumentation.

The gages may be connected to each other by suitable wires extending down through the holes and across the space beneath the bottom surface 6 and thence out through a radial hole 12 in the ring 3 to which a suitable terminal connector is attached. A thin disc type sealing diaphragm 14 may be suitably secured by welding or otherwise to the ring 3 to cover the gaged holes while an annular type diaphragm 15 is suitably supported in an annular recess in the portions 2 and 3.

From the foregoing disclosure it is seen that I have provided a load cell of extremely small height and yet is very simple and economical in construction, operation and maintenance combined with a high degree of ruggedness and freedom from appreciable eccentric load effects while at the same time having other functional characteristics that are desirable in this cell. By virtue of my improved construction I have designed a cell of 25,000 pounds capacity having an outside diameter of 2¾" and a height of 1". These same proportions for height and width would generally be used for cells of proportionately smaller or larger capacity. As a result of my improved arrangement any "end effects" of the shear sensing elements are self-compensated by the arrangement of gages shown in either FIG. 1 or 4, so that the output of the bridge will not be influenced by unwanted deformations of the shear sensing elements but will respond only to the force axially applied on the inner load receiving member.

In FIG. 3 the outer member 3 is provided with an annular shoulder 18 lying in a transverse plane intersecting the shear sensing elements 4 midway of their vertical height. The shoulder is then supported on a suitable member 19. The gases in all forms are preferably vertically symmetrically disposed about this plane which is the center of the sensing elements. Generally this center coincides, but not necessarily so, with the center of the height of the load cell.

It will, of course, be understood that various changes in details of construction and arrangement of parts may be made by those skilled in the art without departing from the spirit of the invention as set forth in the appended claims.

I claim:

1. A load cell comprising, in combination, substantially concentric inner and outer load receiving and load supporting portions constituting action and reaction members for the entire load to be weighed, said portions encircling an axis that extends generally in the direction of applied load, a plurality of radially extending shear sensing elements rigidly connected at each of their radial ends to said portions at circumferentially spaced points thereof, said shear sensing elements having circumferentially extending top and bottom surfaces and axially extending surfaces, said axially extending surfaces having shear strains induced therein in response to the applied axial load, and electrical strain responsive means connected directly to an axial surface of said elements so as to be responsive to the surface shear strain induced by load transmitted between said inner and outer portions.

2. The combination set forth in claim 1 further characterized in that said electrical strain responsive means comprises strain responsive electrical filaments etxending diagonally to the general direction in which load is applied thereby being responsive to the shear strains in the elements.

3. The combination set forth in claim 1 further characterized in that the inner and outer portions and the beams comprise a single integral structure having holes extending in the direction in which load is normally applied to the inner member whereby said shear sensing elements are disposed between adjacent holes.

4. The combination set forth in claim 1 further characterized in that the inner and outer portions and the shear sensing elements comprise a single integral unit in which the shear elements are disposed between axially extending holes of substantially circular form.

5. The combination set forth in claim 1 further characterized in that the electrical strain responsive means comprises pairs of strain sensitive electrical filaments mounted directly on each side of each element, the gage filaments on one side extending diagonally in opposite directions.

References Cited in the file of this patent

UNITED STATES PATENTS

| | | |
|---|---|---|
| 2,487,595 | Ruge | Nov. 8, 1949 |
| 2,488,347 | Thurston | Nov. 15, 1949 |
| 2,488,348 | Ruge | Nov. 15, 1949 |
| 2,576,417 | Ruge | Nov. 27, 1951 |
| 2,597,751 | Ruge | May 20, 1952 |
| 2,796,503 | Ward | June 18, 1957 |
| 2,803,134 | Ward | Aug. 20, 1957 |
| 2,837,620 | MacDonald | June 3, 1958 |
| 2,859,613 | Green | Nov. 11, 1958 |
| 2,866,059 | Laimins | Dec. 23, 1958 |
| 2,909,764 | Chambers | Oct. 20, 1959 |
| 2,969,514 | Curtis | Jan. 24, 1961 |

UNITED STATES PATENT OFFICE
CERTIFICATE OF CORRECTION

May 29, 1962

Patent No. 3,037,178

Hsia-Si Pien

It is hereby certified that error appears in the above numbered patent requiring correction and that the said Letters Patent should read as corrected below.

Column 3, line 2, for "gases" read -- gages --.

Signed and sealed this 18th day of September 1962.

(SEAL)
Attest:

ERNEST W. SWIDER
Attesting Officer

DAVID L. LADD
Commissioner of Patent